Aug. 20, 1957  R. E. LEE  2,803,795
REMOTE CONTROL FOR ELECTRICAL GENERATORS
Filed April 9, 1954  2 Sheets-Sheet 1

INVENTOR.
Robert E. Lee
BY Richard P. Carden
Agent

Aug. 20, 1957  R. E. LEE  2,803,795
REMOTE CONTROL FOR ELECTRICAL GENERATORS
Filed April 9, 1954  2 Sheets-Sheet 2

INVENTOR.
Robert E. Lee
BY Richard P. Cardew
Agent

United States Patent Office 2,803,795
Patented Aug. 20, 1957

2,803,795

REMOTE CONTROL FOR ELECTRICAL GENERATORS

Robert E. Lee, North Branch, Minn.

Application April 9, 1954, Serial No. 422,130

5 Claims. (Cl. 322—28)

This invention relates to electric arc welding and has special reference to an electrically actuated mechanical means for automatically varying the output of a generator used for such welding.

It is well known in the art that much time is wasted by welders in returning to their generator to adjust the output of the generator during a day's work. Changes in the output of the generator are required to accommodate different welding conditions encountered in the day's work. For example, when welding thin material with a small-sized elctrode, less amperage is required than when welding thick material with a heavy electrode. There has been no means provided for adjusting the output of the generator from a remote position, without extra leads, which has gained acceptance in the trade.

It is, therefore, one of the principal objects of this invention to provide a means for adjusting the output of a welding generator from a remote position.

Another object is to provide such a device which is capable of responding to prearranged signals made by the welder at his place of work to either raise or lower the amperage as he desires.

Another object is to provide such a device which is simple in construction and operation.

Another object is to provide such a device which will be relatively inexpensive to manufacture and inexpensive to maintain.

A more specific object is to provide a means for adjusting the output of an arc welding generator wherein the welding leads from the generator will provide the signal transmitting means, and no extra wires are required.

Other objects and advantages of my invention will become more apparent as the description proceeds.

In the accompanying drawing forming a part of this application:

Figure 1:
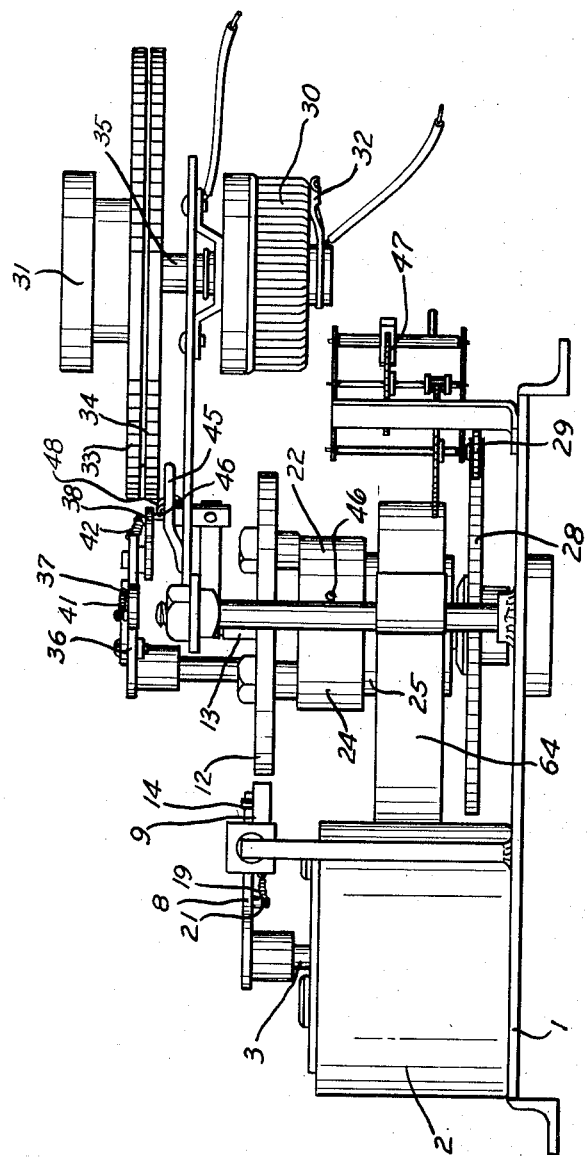
Fig. 1 is a side elevational view of adevice made in accordance with my invention.

In the drawing the reference numeral 1 indicates a base on which my device is mounted. The numeral 2 indicates a conventional rotary solenoid wherein the shaft 3 is caused to move inwardly and to be rotated when power is applied to the coil, not shown, of the solenoid. The solenoid is a device which is readily available on the market, and has a pair of leads 4 and 5 which connect with the coil within the solenoid.

I provide a switch 6 connected to the lead 5 from the solenoid to open and close the circuit to the solenoid, the opposite connection of the switch 6 being connected with a wire 7 which forms a connection of the lead 5 when the switch is in closed position. The switch permits the disconnection of the solenoid from its source of power when desired.

On the upper end of the shaft 3 I provide an arm 8 which rotates with the shaft, the arm being suitably fixed to the shaft and extending normal thereto, as shown. A dog 9 is pivotally secured to the arm 8 as at 10 and extends beyond the end of the arm as shown to engage the teeth 11 of the disc or gear 12 carried adjacent thereto on shaft 13. A lug 14 is fixed to the leading edge 15 of the dog 9 and prevents the dog from pivoting when the arm 8 is moved in the direction of the arrow 16 by means of the lug 14 engaging the leading edge of the arm 8, a notch 17 being provided to receive the lug 14, preferably. The dog 9 is free to pivot rearwardly, however, in order to pass the teeth 11 when the arm 8 rotates in the opposite direction to the arrow 16 returning to normal position as shown in Fig. 2, a spring 18 being provided to assist in the returning of the arm 8 to normal position, as will become apparent.

Figure 2:
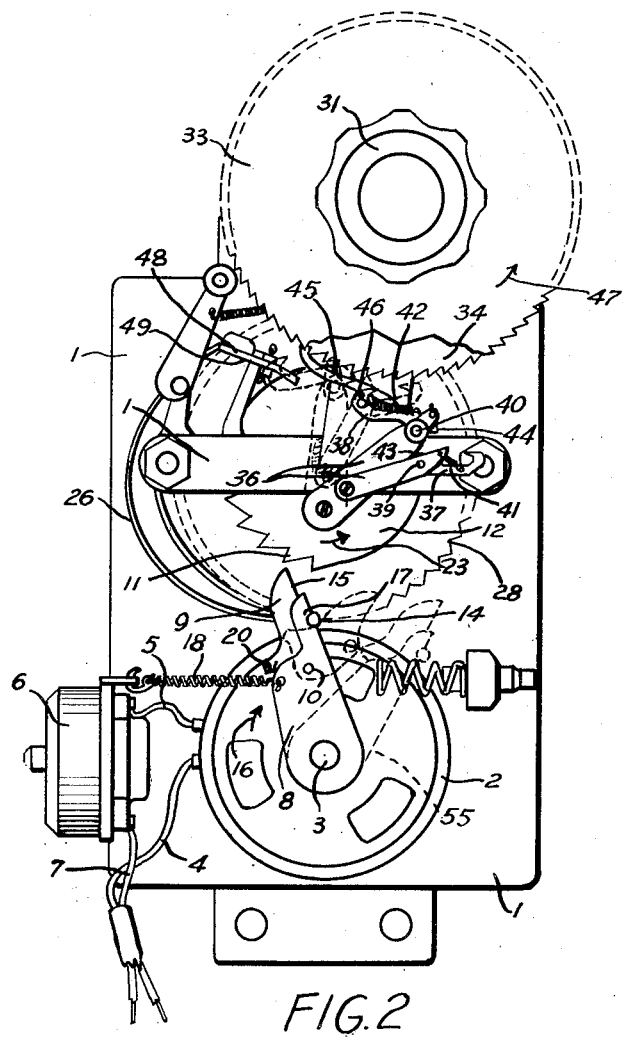
Fig. 2 is a top plan view of Fig. 1.
Figure 3:
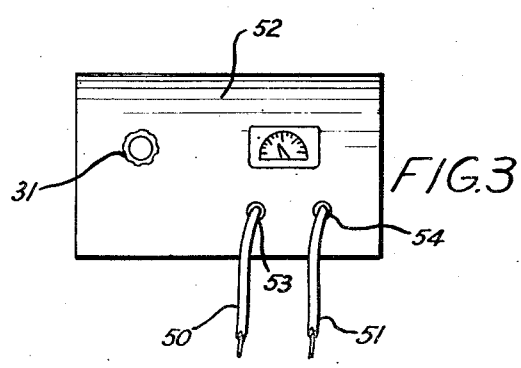
Fig. 3 is an elevational view of a welding generator.
Figure 4:
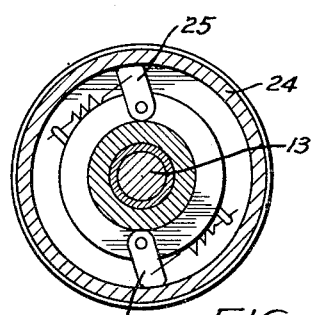
Fig. 4 is a central sectional view of an over-running clutch employed in my invention.

A spring 19 is connected to one end to the dog 9 as at 20 and to the opposite end of arm 8 as at 21 to return the dog 9 to normal position as shown in Fig. 2 after the dog has passed the teeth 11 on the return movement of the arm 8 to normal position.

The gear 12 is fixed to the shaft 13 and will cause the latter to rotate when the dog 9 engages the teeth 11 to rotate the gear 12 when the solenoid 2 is operated, as will become apparent. The shaft 13 has an overrunning clutch 22 operatively connected thereto which permits the rotation of the gear and shaft in the direction of the arrow 23 freely. The structure of the overrunning clutch is conventional. The overrunning clutch has a housing 24 which is engaged by the dogs 25 on the reverse rotation of the shaft 13 causing the outer housing to rotate with the shaft, as is conventional.

Housing 24 is secured to a drum 25 on which a coil spring 26 is operatively wound, the spring 26 being similar to a conventional windup phonograph spring which is well known to the public. The spring is preloaded to a predetermined degree to cause the clutch and shaft to be rotated in a reverse direction to that of arrow 23. A stop 46 is provided on the clutch housing 24 to stop the reverse movement of the clutch, shaft, and gear 12 at a predetermined point wherein the gear teeth 11 are in a position to be engaged by the dog 9 as above described.

An escapement mechanism generally indicated by the numeral 27 is provided to govern the speed of reverse rotation of the shaft 13 and gear 12. The escapement mechanism includes a large gear 28 mounted axially on the shaft 13 and rotatable with the clutch housing 24. A smaller gear 29 engages the gear 28 and thereby, the escapement mechanism 27 is operated to control the speed of rotation of the shaft 13 and gear 12 by the spring 24.

The amperage or output of the generator, not shown, is controlled by means of a voltage rheostat 30, the rheostat having an operating nob 31 which rotates a contact 32 as is conventional. The rheostat is located adjacent the shaft 13 and its appurtenances, as shown. I provide a pair of gears 33 and 34 which are secured to the shaft 35 which is rotatable by the operating nob 31, the teeth on the gears 33 and 34 are disposed in opposite directions, see Fig. 2, the purpose of which will become apparent.

Mounted on the gear 12 is an arm 36 which extends toward the gears 33 and 34 and has a pair of dogs 37 and 38 pivotally connected thereto as at 39 and 40 respectively. The dogs 37 and 38 are each biased by a spring 41 and 42 respectively towards operating position and are provided with a stop 43 and 44 respectively to retain them in operating position. As shown in Fig. 2, the dogs are oppositely disposed and the dog 37 is located above the dog 38 so that the dogs will engage the gears 33 and 34 respectively.

It will be readily seen that the rotation of the gear 12 in the direction of the arrow 23 by the dog 9 engaging the teeth 11 will cause the arm 36 to change position and thus change the position of the dogs 37 and 38. As the gear rotates in the direction of arrow 23 the dogs are brought closer and finally into engagement with the teeth of their respective gears 33 and 34, the degree of rotation of the gear 12 determining which of the dogs contact its gear in an operative connection.

The dog 38 is the first to contact its gear 34 and a guide 45 is provided to regulate the path of the dog 38, a lug 46 depending from the dog 38 to engage the guide and control the path of movement of the dog. It will be noted in Fig. 2 that the dog is held from engaging the gear 34 by the guide until the gear 12 has rotated a predetermined distance. This arrangement provides a safety factor and prevents the adjustment of the rheostat accidentally, as will become apparent. The rotation of the gear 12 causes the dog 38 to engage the teeth of the gear 34 after the required rotation has occurred in the gear 12. The dog 38 is biased by spring 42 to engage into the teeth of the gear 34 and to slip over the gear teeth until the gear 12 is caused to move in the opposite direction of the arrow 23 by the spring 26. At this time the dog engages the teeth of gear 34 and rotates the gear 34 in the direction of the arrow 47. As soon as the lug 46 engages the guide 45 the dog 38 is disengaged from the gear 35 and the rheostat is left in the position to which it has been rotated by the dog 38.

The dog 37 does not operatively engage the teeth of the gear 33 when the dog 38 is in action, and does not operatively engage the teeth of gear 33 until the gear 12 has been rotated in the direction of the arrow 23 to a considerable greater degree. The dog 37 engages the teeth of gear 33 and moves same in the direction opposite to the arrow 47 as the gear 12 is rotated in the direction of the arrow 23 the degree of rotation of the gear 33 by the dog 37 is controlled by the degree of rotation of the gear 12, as will become apparent, The dog 38 is prevented from rotating the gear 34 when the dog 37 is in action by virtue of the guide 48, for the rotation of the gear 12 to a sufficient degree to cause the operative action of the dog 37 brings the lug 46 of the dog 38 around the end of the return guide 48 so that the lug 46 rides on the surface 49 of the guide and the dog 38 is held away from engagement with the gear 34.

In operation, the leads or wires 4 and 5 are connected to the welding leads 50 and 51 of the welding generator 52, the lead 4 being connected to connection 53 and the lead 7 being connected to the connection 54 (or vice versa), the connection 53 and 54 being the output take-off connections from the generator 52, as is deemed apparent to permit welding operations to be performed by suitable implements, not shown, at the ends of the welding cables and leads 50 and 51.

The connection of the wires 4 and 7 to the connections 53 and 54 places the current of the solenoid 2 across or in parallel or shunt with the generator output. The solenoid 2 is of a type which causes the rotation of the shaft 3 when current of a predetermined degree is passing through the coil so that the arm 8 will be held in a position of the dotted lines 55. As soon as the current passing through the coil of the solenoid is reduced below a predetermined amount, the solenoid can no longer hold the arm 8 in the position 55 and it is released and instantly moves back to its normal unloaded position shown in solid lines, Fig. 2. Thus when the generator is running under no load, and the open circuit voltage is at a maximum the solenoid holds the arm in position 55, however, as soon as the generator is under load as when grounding the electrode, the arm 8 is released and moves rearwardly. Note: Holding a welding arc does not actuate arm 8.

The movement of the arm 8 forwardly to position 55 causes the dog 9 to engage the teeth 11 of the gear 12 to rotate same in the direction of the arrow 23, as is deemed apparent.

A welder who is in a remote location from his machine and who wishes to turn the rheostat in the direction of arrow 47 to change the amperage output of the generator needs only to perform a plurality of dead shorts quickly to cause the dog 9 to repeatedly engage the teeth 11 one at a time to progressively rotate the gear 12 step by step in the direction of the arrow 23. I have predetermined that the rapid movement of the arm 8 two times will have no effect or cause any change in the position of the rheostat contact 32, the guide 45 being of sufficient length to hold the dog 38 out of engagement with the gear 34 during the rotation of the gear 23 the distance of two teeth 11. This arrangement prevents accidental rotation of change in position of the rheostat contact 32 during accidental shorts of the electrode. In order to change the position of the rheostat contact in the direction of the arrow 47, three dead shorts must be struck in rapid succession to rotate the gear 12 sufficiently to cause the dog 38 to engage the teeth of the gear 34 and permit the dog 38 to rotate the gear 34 as above described on the return rotation of the gear 23 by the spring 26.

Obviously, the escapement mechanism 27 slows down the rotation of the gear 12 in the reverse direction sufficiently to permit the dog 9 to engage successively teeth 11 at the rapid successive dead shorts of electrode. Without the escapement of a governor mechanism the gear 12 would quickly be rotated in the reverse direction to the arrow 23 and nothing would be accomplished by my mechanism.

In order to change the position of the contact 32 in the opposite direction to the arrow 47 five dead shorts of the electrode must be performed and the fifth dead short will bring the lug 46 around the guide 48 to be carried along the guide surface 49 out of the engagement with the gear 34 simultaneously with the engagement with the dog 37 into the teeth of gear 33 to rotate the gear 33 in the direction opposite to the arrow 47 to a predetermined degree.

Obviously, the degree of rotation of the rheostat contact can be predetermined by a choice of gear size, amount of dog travel, and the like, to provide a raising or lowering of the output of the generator a given or desired amount. Thus, if the welder wishes to change the output of the generator he may do so by regulating the number of times he causes electrode grounding three or five successive times.

Obviously, the work of a welder is greatly facilitated by his being able to adjust the output of his welding generator from a remote position in a minimum of time and with accuracy. If more or less output is desired repeated signals will turn the rheostat all the way up or down.

Having thus described my invention, what I claim is:

1. In a solenoid-operated mechanical movement adapted to adjust a voltage rheostat and be controlled by the output of a generator: a solenoid having an arm plunger connected thereto, which is rotatable in one direction by said solenoid under predetermined load conditions of said generator, a shaft extending adjacent said arm and being rotatable in one direction by the latter as it moves in one direction, said arm and shaft being biased towards rotation in their respective reverse directions to return to normal position after being rotated by said solenoid, a governor mechanism operatively connected to said shaft for controlling the speed of rotation of said shaft in its reverse direction, a pair of dogs connected and movable with said shaft a guide mounted adjacent said shaft and disposed diagonally thereto, one of said dogs being engageable on said guide to contact the movement of said one of said dogs as said shaft is rotated in said one direction to a predetermined position, a return guide adjacent and in angular relation to first said guide to control the return movement of said one of said dogs after said shaft is rotated in said one direction to a greater predetermined position, and gear means engageable and rotatable by said dogs in each direction by one of said dogs during predetermined periods of the rotation of said shaft, said gear means being connected to said rheostat to change the setting there.

2. In a solenoid-operated mechanical movement to change the contact setting of a voltage rheostat; a solenoid, an arm extending from and rotatable by said solenoid in one direction, spring means to move said arm in the opposite direction, a shaft extending adjacent said arm and being rotatable by said arm in a forward direction as said arm is rotated by said solenoid, means for rotating said shaft in a reverse direction, a governor mechanism for controlling the speed of rotation of said shaft in said reverse direction, gear means mounted on said rheostat to permit movement of said contact, and means operated during the rotation of said shaft for rotating said gear means in both directions to raise or lower the setting of said contact on said voltage rheostat.

3. In a solenoid-operated mechanical movement to change the contact setting of a voltage rheostat controlling the output of a generator; a solenoid, an arm extending from said solenoid and being movable thereby in one direction, spring means to move said arm in the opposite direction, a shaft extending adjacent said arm and being rotatable by said arm in a forward direction as said arm is moved by said solenoid, means for rotating said shaft in reverse direction, a governor mechanism for controlling the speed of rotation of said shaft in said reverse direction, gear means having a driving connection with said rheostat to move said contact in either direction and means operated by the rotation of said shaft for rotating said gear means in both directions to raise and lower the setting of said contact, said last mentioned means comprising dog means movable with the rotation of said shaft and engageable with said gear means to rotate same in either direction, and guide means to control the engagement of said dog means with said gear means during predetermined degrees of rotation of said shaft.

4. In a solenoid-operated mechanical movement to change the contact setting of a voltage rheostat controlling the output of a generator; a solenoid, an arm extending from said solenoid and being movable thereby, a shaft extending adjacent said arm, a toothed wheel on said shaft, said arm having means to engage the teeth on said wheel as it is moved to rotate said shaft in a forward direction, means to rotate said shaft in a reverse direction, means governing the speed of rotation of said shaft in said reverse direction, gear means having a driving connection with said rheostat to move said contact in either direction and means operated by the rotation of said shaft for rotating said gear means in both directions to raise and lower the setting of said contact, said last mentioned means comprising dog means movable with the rotation of said shaft and engageable with said gear means to rotate same in either direction, and guide means to control the engagement of said dog means with said gear means during predetermined degrees of rotation of said shaft.

5. The structure as set forth in claim 3 and said governoring means include: a spring, an overrunning clutch, and an escapement mechanism.

References Cited in the file of this patent

UNITED STATES PATENTS

| | | |
|---|---|---|
| 287,511 | Edison | Oct. 30, 1883 |
| 1,992,303 | Haas | Feb. 26, 1935 |
| 1,993,720 | Nye | Mar. 5, 1935 |